G. L. IVES.
Combined Horse-Rake and Tedder.

No. 135,276. Patented Jan. 28, 1873.

Witnesses:

Inventor:
G. L. Ives
PER
Attorneys.

AM. PHOTO-LITHOGRAPHIC CO. N.Y. (OSBORNE'S PROCESS)

UNITED STATES PATENT OFFICE.

GEORGE L. IVES, OF ROME, NEW YORK.

IMPROVEMENT IN COMBINED HORSE RAKES AND TEDDERS.

Specification forming part of Letters Patent No. 135,276, dated January 28, 1873.

*To all whom it may concern:*

Be it known that I, GEORGE L. IVES, of Rome, Oneida county, State of New York, have invented a new and Improved Hay-Tedder, of which the following is a specification:

My invention consists of a hay-tedder attachment to the truck of a hay-rake for which a patent was granted to me on the 13th of August, 1872, No. 130,431. Said attachment includes a shaft (with arms attached for stirring or turning the hay) journaled in bearings or boxes swiveled in the rear ends of arms, whose forward ends are jointed to the wheeled truck-shaft, and also to an intermediate frame, which latter is adapted to be readily connected to and disconnected from the truck, so that it may be made to alternate, in practical use, with a common wire-rake attachment, which the truck is otherwise constructed to carry and operate.

Figure 1:
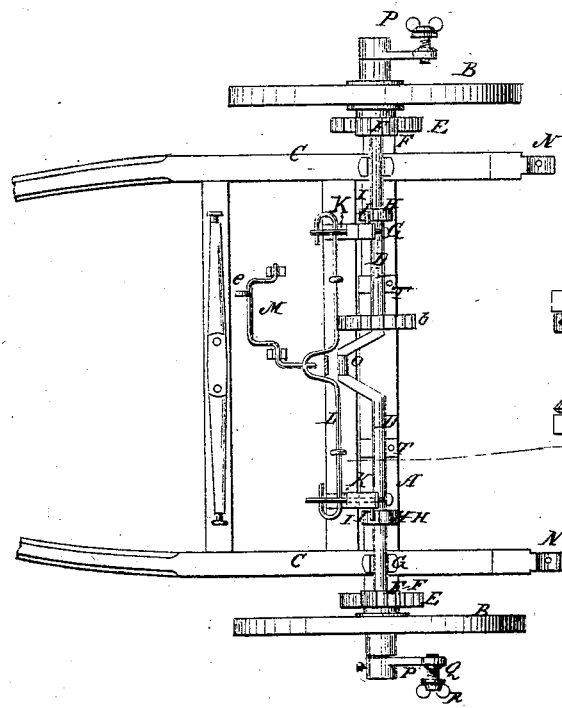
Figure 2:
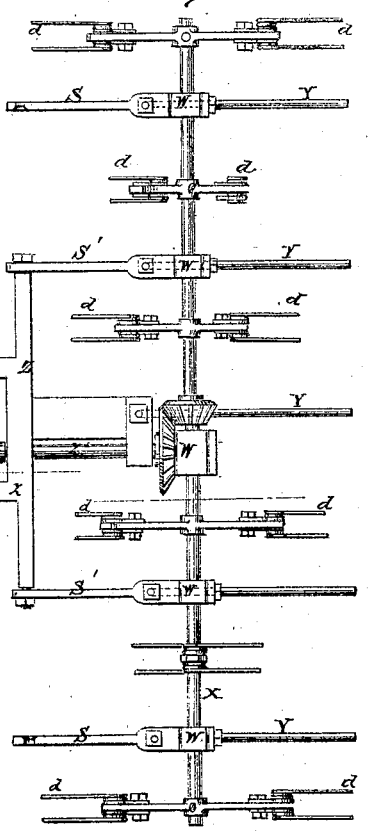
Figure 3:
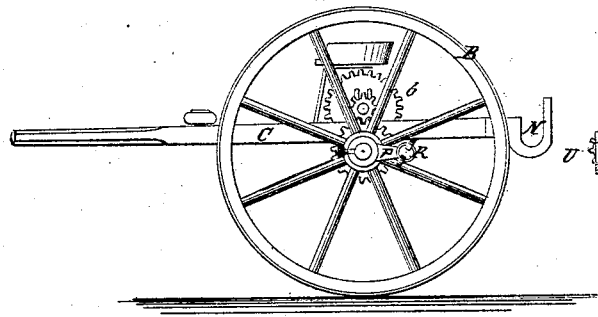
Figure 4:
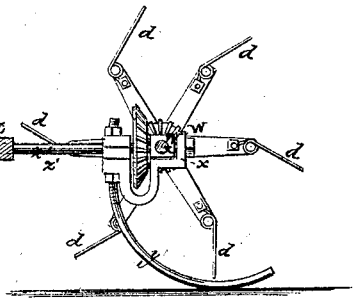

Figure 1 is a plan view of the truck employed with the before-mentioned hay-rake, which is removed, the said truck being provided with the modifications necessary for the attachment of the tedder. Fig. 2 is a plan view of the tedder attachment. Fig. 3 is a side elevation of Fig. 1, and Fig. 4 is a transverse section of Fig. 2 on the line $x\ x$.

A is the axle of the truck; B, the wheels; C, the shafts; D, the crank-shaft for dumping the rake; E, the wheels on the axle; and F, the pinions on the crank-shaft for turning the latter. G represents the slotted bearings for the crank-shaft, in which it moves down and up to gear the rake and ungear it each time it is to be actuated. H represents cams, and I pins for holding the shaft in gear the time required for operating the rake. K represents levers; L, a rock-shaft; and M, a foot-lever, for forcing the shaft down, when it is to be put in gear, against springs, (not shown,) which throw it out of gear automatically when notches in the cams come under the pins I. N represents bearings at the ends of the rear extensions of the shafts in which the shaft of the rake is mounted. O is the crank to which the arm of the rake is connected by a connecting-rod for being raised to dump the hay.

Now, I propose to utilize this truck and driving-shaft for working a hay-tedder to be attached when the rake is removed; and for this purpose I have the axle A project at the ends a little beyond the hubs and attach a crank-arm, P, with a wrist-pin, Q, and binding-nut R, to attach the bars S of the tedder readily, and to hold them so they will oscillate freely; and inside of the wheels I arrange slotted bearing-blocks T, in which to connect the short shaft U, which is confined by pins V. The arms carry swiveled bearings W at the rear ends, in which the tedder-shaft X is mounted near its ends, and they have a bent guide-runner, Y, to run upon the ground and support the tedder-shaft and the spreading-forks the right height above the ground for working properly. The shaft U is mounted in a frame, Z, to which two other bars, S', which have swivel-bearings W for the shaft, are pivoted, and which also carries a similar swivel-bearing, in which the shaft works at the middle, and which also carries the connecting-shaft Z' for gearing the tedder-shaft with the shaft U, which gears with the crank-shaft by the wheels $a\ b$ when the tedder is attached to the truck. The bars S' and the frame Z also have runners Y for supporting the tedder and gaging it to the ground. The swiveled bearings W are for allowing the tedder-shaft to rise and fall at either end in the main independently of the other, so that the tedder will accommodate itself to the inequalities of the ground as it rides along on the runners Y, whereby the forks $d$ are prevented from striking the knolls, which the forks of the ordinary tedders are subject to.

This part of the invention I regard as very important, for by it the forks are protected, and the taking of the hay by them is insured. As the hay-rake is only required to be kept in gear during about half a turn of the crank-shaft at one time, the cams H and pins I are employed to keep the crank-shaft in gear after being geared by the foot-treadle and the notches in the cams, and the springs before mentioned are employed to ungear the crank-shaft automatically after each half turn; but the tedder requires to be kept continually in gear; therefore I arrange a spring-catch or a turn-catch, $e$, with the foot-treadle used for throwing the crank-shaft in gear, so that it may catch the foot-lever and hold the shaft in gear, and so that it can be readily disconnected when the machine is turning at the ends of the field to ungear the tedder, which it will probably be found desirable to do, although it may be kept in gear, as the pinions F are to connect with the shaft by ratchets and pawls, to allow one to overrun the other. The runners Y are attached to the bars S and frame Z, so as to be adjusted to raise or lower the tedder, as required.

Having thus described my invention, I claim as new and desire to secure by Letters Patent—

1. The combination, with a tedder-shaft and with bars S' S' for connecting the same with the truck or an intermediate frame, of the swiveled bearings W, substantially as shown and described.

2. The combination, with the hay-rake truck, of the attaching devices for the tedder, consisting of the slotted bearing-boxes T for the shaft U, and the crank-arms P, wrists Q, and binding-nuts R, substantially as specified.

GEORGE L. IVES.

Witnesses:
LORENZO R. COVELL,
CYRUS GREENE.